(12) United States Patent
Iorga et al.

(10) Patent No.: US 11,772,722 B2
(45) Date of Patent: Oct. 3, 2023

(54) ACTIVE DIFFUSER MECHANISM

(71) Applicant: JAGUAR LAND ROVER LIMITED, Coventry (GB)

(72) Inventors: George Tudor Iorga, Leamington Spa (GB); Ross Turner, Clifford Chambers (GB); Sébastien Chaligné, Leamington Spa (GB); Adrian Philip Gaylard, Southam (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 232 days.

(21) Appl. No.: 17/286,778

(22) PCT Filed: Oct. 18, 2019

(86) PCT No.: PCT/EP2019/078445
§ 371 (c)(1),
(2) Date: Apr. 19, 2021

(87) PCT Pub. No.: WO2020/079263
PCT Pub. Date: Apr. 23, 2020

(65) Prior Publication Data
US 2021/0339808 A1 Nov. 4, 2021

(30) Foreign Application Priority Data

Oct. 19, 2018 (GB) .................................... 1817026

(51) Int. Cl.
*B62D 35/02* (2006.01)
*B62D 35/00* (2006.01)
*B62D 37/02* (2006.01)

(52) U.S. Cl.
CPC ........... *B62D 35/02* (2013.01); *B62D 35/007* (2013.01); *B62D 37/02* (2013.01)

(58) Field of Classification Search
CPC ....... B62D 35/02; B62D 35/007; B62D 37/02
See application file for complete search history.

(56) References Cited

U.S. PATENT DOCUMENTS 9,527,535 B1 12/2016 Cha et al.
2014/0097638 A1 4/2014 Froling et al.
(Continued)

FOREIGN PATENT DOCUMENTS

CN 103707946 A * 4/2014 ............. B62D 35/02
DE 3011652 A1 10/1981
(Continued)

OTHER PUBLICATIONS

International Search Report corresponding to International Application No. PCT/EP2019/078445, dated Jan. 23, 2020, 5 pages.
(Continued)

*Primary Examiner* — Lori Lyjak
(74) *Attorney, Agent, or Firm* — REISING ETHINGTON P.C.

(57) ABSTRACT

Aspects of the present invention relate to an active diffuser mechanism for a vehicle comprising a mounting mechanism for connecting a diffuser body to a body of a vehicle such that the diffuser body is moveable between a stowed position and a deployed position in which an airflow surface of the diffuser body is spaced further away from the body of the vehicle than in the stowed position. The mounting mechanism comprises a linkage mechanism configured such that the diffuser body follows a linear translation path and a rotational path during movement from the stowed position to the deployed position. Aspects of the present invention also related to an active diffuser assembly, an active diffuser system and a vehicle comprising such an active diffuser mechanism.

19 Claims, 15 Drawing Sheets

(56) References Cited

U.S. PATENT DOCUMENTS

2015/0353148 A1    12/2015  Wolf
2017/0050684 A1     2/2017  Kim
2017/0120968 A1     5/2017  Povinelli et al.
2018/0134330 A1     5/2018  Cha et al.
2019/0337577 A1*   11/2019  Del Gaizo ........... B62D 35/007

FOREIGN PATENT DOCUMENTS

DE      102013105842 A1    12/2014
KR      1020150129254 A    11/2015
WO         2015191697 A2   12/2015

OTHER PUBLICATIONS

Written Opinion corresponding to International Application No. PCT/EP2019/078445, dated Jan. 23, 2020, 7 pages.
Combined Search and Examination Report corresponding to Great Britain Application No. GB 1817026.6, dated Mar. 27, 2019, 6 pages.
English translation of Chinese Office Action corresponding to Chinese Application No. 201980068991.8, dated Jul. 26, 2022, 27 pages total (pp. 1-17 English translation of Chinese OA, pp. 18-27 Chinese OA).

* cited by examiner

ACTIVE DIFFUSER MECHANISM

TECHNICAL FIELD

The present disclosure relates to a mechanism for an active diffuser for a vehicle. Aspects of the invention relate to an active diffuser mechanism, an active diffuser assembly, an active diffuser system, and vehicle including such an active diffuser mechanism, assembly and/or system.

BACKGROUND

It is known to provide aerodynamic features to a vehicle body to improve aerodynamic performance, for example to improve fuel economy, reduce $CO_2$ emissions, and/or improve vehicle dynamic performance such as drag reduction. Achieving drag reduction in an electric vehicle also has then benefit of range improvement. One area of a vehicle body that may be so adapted is the aerodynamic surface under the rear floor of the vehicle, known as a diffuser. Diffusers may help reduce lift and thereby improve vehicle stability and handling. However, a profile and position required for a diffuser to deliver optimum vehicle drag and/or lift reduction may conflict with the profile of the rear floor of the vehicle to achieve good off road capability. Furthermore, a diffuser functionally designed for optimum vehicle drag may result in the vehicle having a less pleasing aesthetic.

It is an aim of the present invention to address one or more of the above-mentioned disadvantages.

SUMMARY OF THE INVENTION

Aspects and embodiments of the invention provide an active diffuser mechanism for a vehicle, an active diffuser assembly comprising such an active diffuser mechanism, an active diffuser system comprising such an active diffuser mechanism, and a vehicle comprising such an active diffuser mechanism, assembly or system as claimed in the appended claims According to an aspect of the present invention there is provided an active diffuser mechanism for a vehicle comprising a mounting mechanism for connecting a diffuser body to a body of a vehicle such that the diffuser body is moveable between a stowed position and a deployed position in which an airflow surface of the diffuser body is spaced further away from the body of the vehicle than in the stowed position, wherein the mounting mechanism comprises a linkage mechanism configured such that the diffuser body follows a linear translation path and a rotational path during movement from the stowed position to the deployed position.

The mounting mechanism may comprise at least one linkage configured to be connected proximate a leading edge of the diffuser body and connectable to the body of the vehicle and configured such that the leading edge of the diffuser body moves in a forward direction during movement from the stowed position to the deployed position.

The mounting mechanism may comprise a plurality of pivoting linkage arms, wherein the pivot axes of the linkage arms all extend parallel to each other.

The plurality of pivoting linkage arms may all lie in, and be moveable in, parallel planes.

The mounting mechanism may be configured to form a four-bar linkage mechanism with the diffuser body such that the diffuser body comprises a first linkage arm of the four-bar linkage, a second linkage arm is pivotally connected to the first linkage arm in the region of a leading edge of the diffuser body, and a third linkage arm is pivotally connected to the first linkage arm in the region of a trailing edge of the diffuser body.

The mounting mechanism may comprise a Peaucellier-Lipkin linkage.

The mounting mechanism may comprise a four-bar linkage configured to be connected to the diffuser body in the region of a leading edge of the diffuser body and connectable to the vehicle, and the Peaucellier-Lipkin linkage may be connected to the diffuser body in the region of a trailing edge of the diffuser body and is connectable to the body of the vehicle.

The mounting mechanism may be configured such that, as the diffuser body moves from the stowed position to the deployed position, a path of the leading edge of the diffuser body includes rotational movement and a path of the trailing edge of the body includes rotational movement.

The mounting mechanism may be configured such that, as the diffuser body moves from the stowed position to the deployed position, a path of a leading edge of the diffuser body includes both rotational and translational movement and a path of a trailing edge of the body includes both rotational and translational movement.

The mounting mechanism may be configured such that, as the diffuser body moves from the stowed position to the deployed position, a path of a leading edge of the diffuser body includes rotational movement and a path of a trailing edge of the body includes only linear movement.

The mounting mechanism may comprise a plurality of pivoting linkage arms, wherein linkage arms of different dimensions are provided for at least one of the linkage locations, and wherein the linkage arm of the at least one linkage location is interchangeable with a linkage arm of a different dimension in order to alter the movement path of the diffuser body between the stowed and deployed positions. This may advantageously allow provision of a modular active diffuser mechanism which is simple to modify for different vehicle applications where the vehicles have different dimensions and diffuser deployment requirements. This can also provide a convenient and flexible active diffuser mechanism and system for ongoing testing and development purposes.

The active diffuser mechanism may comprise an actuator coupled to the mounting mechanism and operable to move the diffuser body between the stowed and deployed positions.

The actuator may comprise a rotary actuator having a drive shaft and a drive arm extending from the drive shaft and connected to the mounting mechanism.

The active diffuser mechanism may comprise a shock protection mechanism disposed between the diffuser body and the actuator and configured to absorb shock forces transmitted from impact of the diffuser body to prevent damage to the actuator.

The shock protection mechanism may comprise a clutch disposed between the actuator and the mounting mechanism.

The shock protection mechanism may comprise a damper disposed between the diffuser body and the actuator.

According to an aspect of the present invention there is also provided an active diffuser assembly comprising an active diffuser mechanism as described above, and a diffuser body. Optionally, the diffuser body may comprise a rear surface extending from a trailing edge of the diffuser body and configured, in use, to extend between the body of the vehicle and the trailing edge of the diffuser body when the diffuser body is in the deployed position.

The diffuser body may comprise side surfaces extending from the side edges of the diffuser body and configured, in use, to extend between the body of the vehicle and the side edges of the diffuser body when the diffuser body is in the deployed position. The side surfaces may extend between leading and trailing edges of the diffuser body. The side surfaces may comprise diffuser fences which in a deployed position, may extend below the airflow surface. Such diffuser fences may extend below the airflow surface in both the deployed and stowed position of the diffuser body, or may extend below the airflow surface only in the deployed position of the diffuser body.

The rear surface and/or the side surfaces may be collapsible such that they collapse when the diffuser body moves into the stowed position. The rear surface and/or the side surfaces may comprise flexible walls, bellows, or plates capable of sliding over each other or telescopic panels to be collapsible.

According to an aspect of the present invention there is also provided an active diffuser system comprising an active diffuser mechanism as described above, a controller connected to the actuator and configured to control operation of the actuator, and at least one sensor configured to detect at least one parameter of operation of the vehicle and to provide a signal to the controller indicative of the detected parameter, wherein the controller is configured to control operation of the actuator in dependence on the received signal.

The at least one sensor may comprise a speed sensor and the controller may be configured to operate the actuator to move the diffuser body into the deployed position when a signal is received indicating the speed of the vehicle exceeds a first threshold value. The at least one sensor may comprise a manually or automatically operable switch.

The at least one sensor may comprise a speed sensor and the controller may be configured to operate the actuator to move the diffuser body into the stowed position when a signal is received indicating the speed of the vehicle is less than a second threshold value.

The at least one sensor may comprise a speed sensor and the controller may be configured to prevent operation of the actuator to prevent any movement of the diffuser body when a signal is received indicating the speed of the vehicle exceeds a third threshold value.

The controller may be configured to operate the actuator to move the diffuser body into the stowed position when a signal is received from the vehicle indicating the vehicle is travelling off-road.

According to an aspect of the present invention there is also provided a vehicle comprising a body, and an active diffuser mechanism as described above, an active diffuser assembly as described above, and/or an active diffuser system as described above.

The vehicle may comprise an undertray, and in the deployed position, a leading edge of the diffuser body may be less than 10 mm in a longitudinal direction of the vehicle from an adjacent trailing edge of the undertray.

The vehicle may comprise an undertray, and in the deployed position, a leading edge of the diffuser body may be flush with or disposed above the level of an adjacent trailing edge of the undertray in a vertical direction.

The vehicle may comprise an undertray, and in the deployed position, a leading edge of the diffuser body may be coplanar with an adjacent trailing edge of the undertray, or differ in planar angle by less than 2 degrees.

The lowest part of the diffuser body may lie on or above a line extending rearwards tangentially from the vehicle rear wheel to intersect the lowest point of the rear of the body of the vehicle.

The mounting mechanism may be configured such that movement of the diffuser body from the stowed position to the deployed position is both simultaneously rotational and translational by means of the single mounting mechanism. The active diffuser mechanism may comprise one single actuator to effect simultaneous rotational and translational movement of the diffuser body.

In an embodiment in which the mounting mechanism comprises a Peaucellier-Lipkin linkage, a pivot point of a four-bar linkage of the Peaucellier-Lipkin linkage may be coupled directly to diffuser body, or alternatively, may be coupled to the diffuser body by means of a connecting link. The active diffuser mechanism may be configured such that, during movement of the diffuser body between the stowed and deployed positions, a connecting point of the mounting mechanism on the diffuser body may move only linearly, or may move in both a rotational and translational path.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
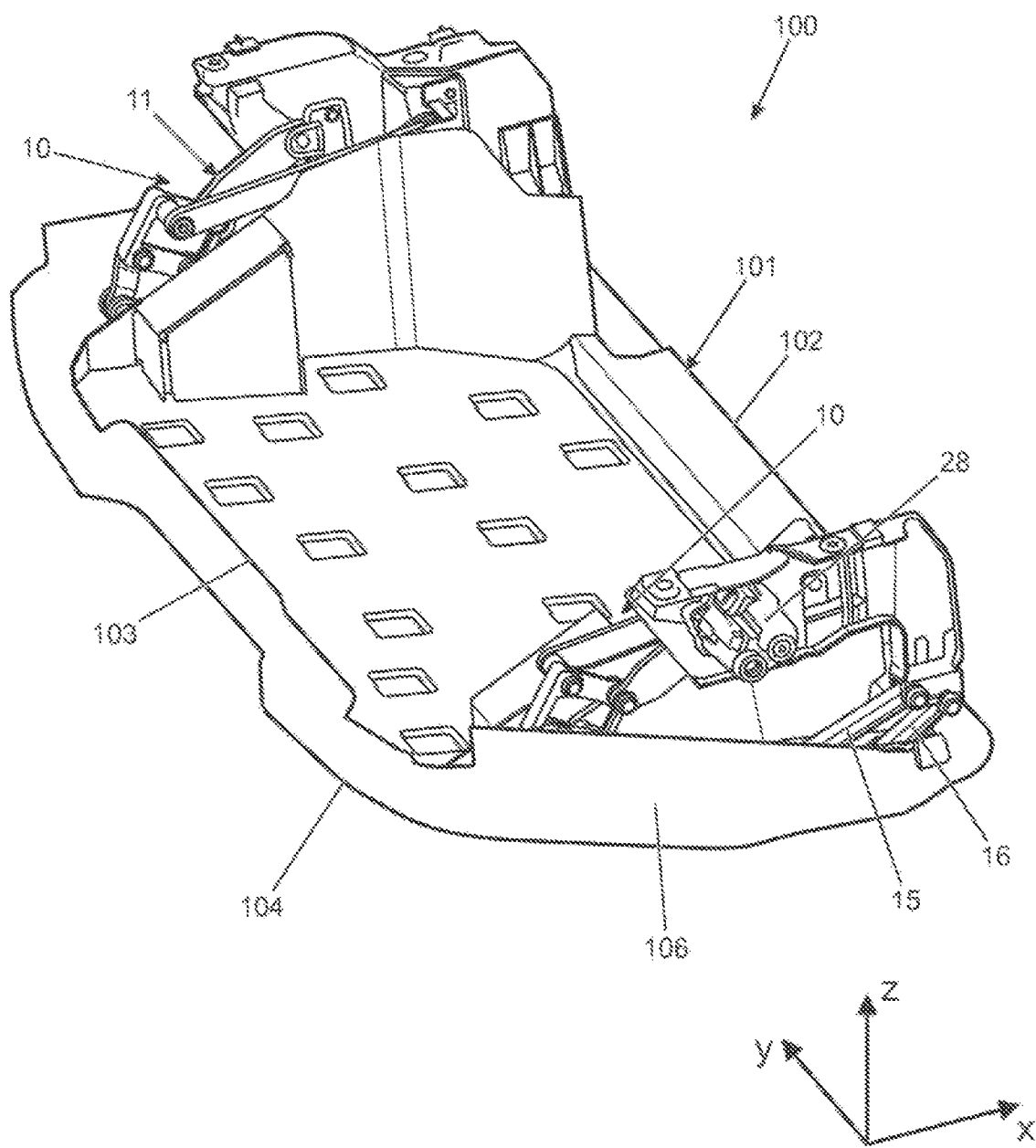
FIG. 1 shows a perspective view of an active diffuser assembly comprising an active diffuser mechanism and diffuser body according to an embodiment of the invention.
Figure 2:
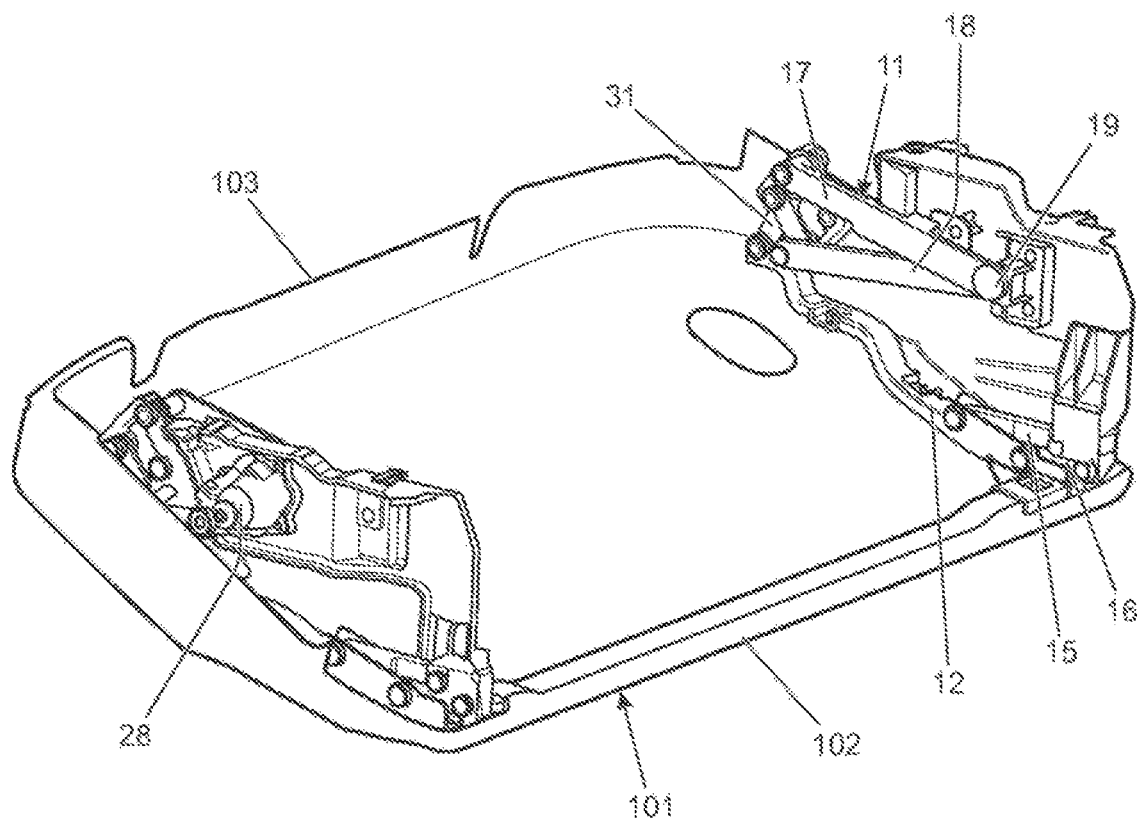
FIG. 2 shows another perspective view of the active diffuser assembly of FIG. 1.
Figure 3:
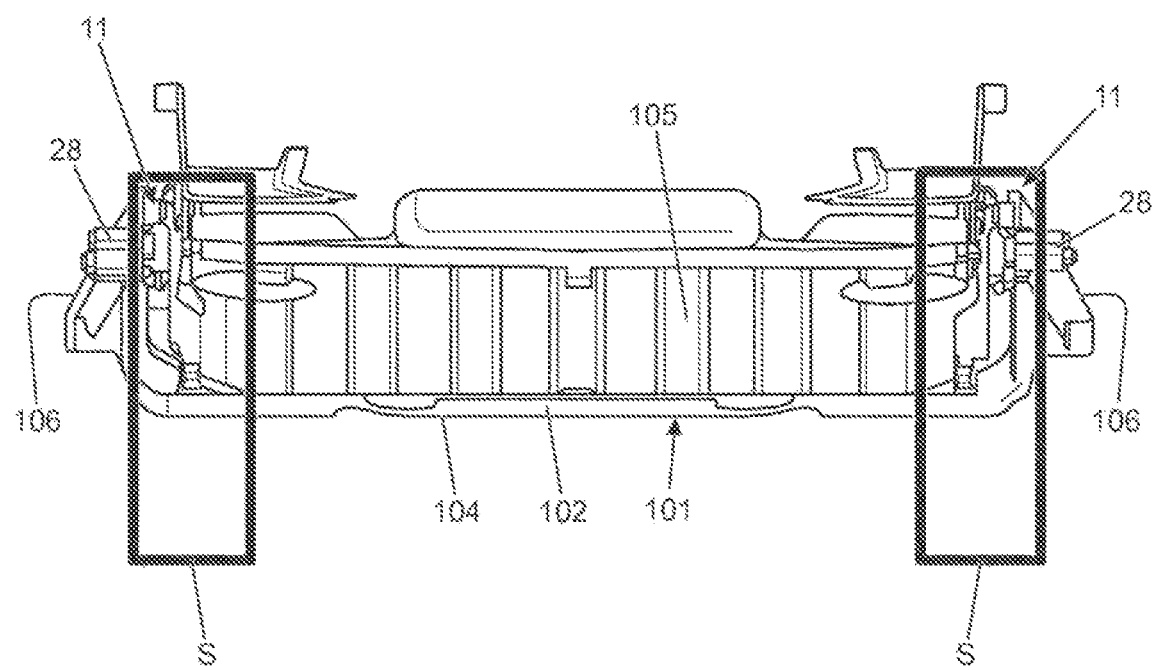
FIG. 3 shows a front view of the active diffuser assembly of FIGS. 1 and 2.

An active diffuser assembly 100 comprising an active diffuser mechanism 10 in accordance with an embodiment of the present invention is described herein with reference to the accompanying FIGS. 1 to 4.

The active diffuser mechanism 10 comprises mounting mechanisms 11 to be connected to a diffuser body 101 to mount the diffuser body 101 to a body of a vehicle 1000. The embodiment shown in FIGS. 1 to 3 comprises two mounting mechanisms 11, one on each side of the diffuser body 101. However, it is intended within the scope of the invention that more than two mounting mechanisms 11 may be provided, or one single mounting mechanism 11 may be provided. In the case of a single mounting mechanism 11, the mechanism 11 may be centrally located with respect to the diffuser body 101. The description hereafter describes one of the two mounting mechanisms 11 shown in FIGS. 1 to 3.

The mounting mechanism 11 comprises a support arm 12 to which is connected the diffuser body 101 at one side of the diffuser body 101. The diffuser body 101 includes a leading edge 102 and a trailing edge 103. When the diffuser body 101 is mounted to a body of a vehicle 1000, the leading edge 102 is disposed facing the front F of the vehicle 1000 and the trailing edge 103 is disposed facing the rear R of the vehicle 1000. Reference herein to "front" or "forward" direction and "rear" or "rearwards" direction are respectively in reference to the front and rear of the vehicle 1000 to which the diffuser body 101 is intended to be attached. Similarly, reference herein to "upwards" and "downwards" are in reference to the orientation of the vehicle 1000 to which the diffuser body 101 is intended to be attached. A direction from the front F to the rear R of the vehicle 1000 is referred to herein as a "longitudinal" direction of the vehicle, and a direction perpendicular to the longitudinal direction, that is extending between left and right sides of the vehicle 1000, is referred to herein as a "transverse" direction of the vehicle. A direction perpendicular to the longitudinal direction, that is extending between upper and lower areas of the vehicle 1000, is referred to herein as a "vertical" direction of the vehicle. FIG. 1 includes an axis triad in which the x-axis points in the forward longitudinal direction of the vehicle, the y-axis points in the transverse direction to the left side of the vehicle and the z-axis points upwards in the vertical direction of the vehicle.

The mounting mechanism 11 includes a first linkage 13 which is connected to a forward end of the support arm 12 proximate the leading edge 102 of the diffuser body 101. The mounting mechanism includes a second linkage 14 which is connected to a rear end of the support arm 12 proximate the trailing edge 103 of the diffuser body 101.

Figure 4:
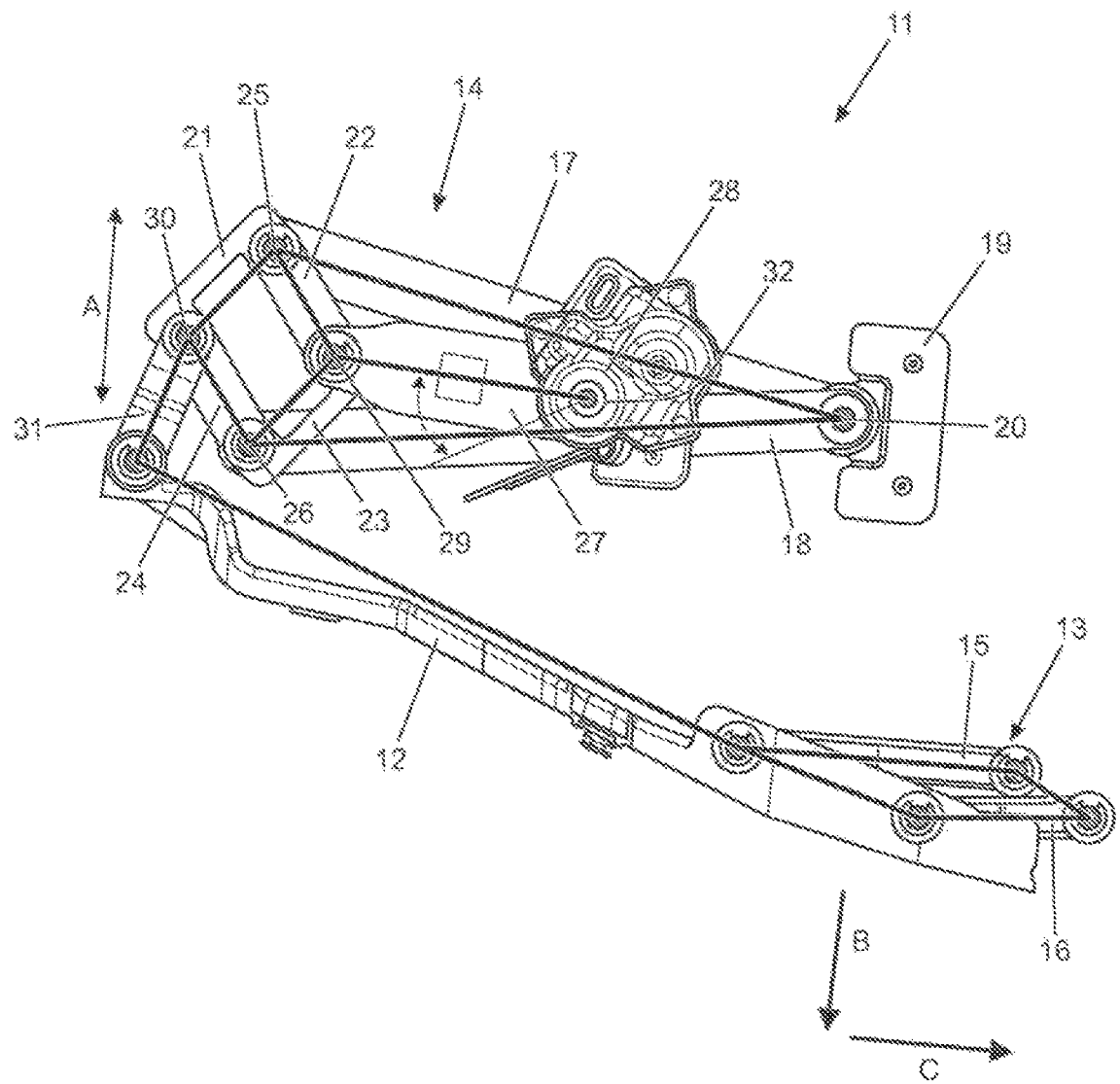
FIG. 4 shows a schematic side view of the active diffuser mechanism of the active diffuser assembly shown in FIGS. 1 to 3.

The first and second linkages 13, 14 and support arm 12 are shown schematically in FIG. 4. The first linkage 13 comprises upper and lower link arms 15, 16. The upper link arm 15 is has a first end pivotally connected to the support arm 12 and a second end pivotally connectable to a body of the vehicle 1000, either directly or by means of a connecting bracket (not shown). The lower link arm 16 is has a first end pivotally connected to the support arm 12 at a position forward of the position at which the first end of the upper link arm 15 is connected to the support arm 12. The lower link arm 16 has a second end pivotally connectable to the body of the vehicle 1000, either directly or by means of a connecting bracket (not shown), which may be the same connecting bracket the second end of the upper link arm 15 is connected to, or may be a separate connecting bracket. The second ends of the upper and lower link arms 15, 16 are fixed relative to each other.

The upper and lower link arms 15, 16, together with the support arm 12 and the bracket(s) or vehicle body to which the upper and lower link arms 15, 16 are connected, thereby form a four-bar linkage arrangement by which the leading edge 102 of the diffuser body 101 can be connected to the body of a vehicle 1000.

The second linkage 14 comprises a Peaucellier-Lipkin linkage and includes first and second main linkage arms 17, 18 of equal length and each with a first end pivotally connected to a support bracket 19 about a common pivot point 20. First to fourth secondary linkage arms 21, 22, 23, 24 are pivotally connected together in a trapezoidal or four-bar-linkage configuration. The second end of the first main linkage arm 17 is pivotally connected to the pivotal connection 25 of the first and second secondary linkage arms 21, 22, and the second end of the second main linkage arm 18 is pivotally connected to the pivotal connection 26 of the third and fourth secondary linkage arms 23, 24.

A first end of a driver arm 27 is connected to a rotary actuator 28 to power the driver arm 27 to move up and down. A second end of the driver arm 27 is pivotally connected to the pivotal connection 29 of the second and third secondary linkage arms 22, 23. The actuator 28 can thereby power the driver arm 27 to move the four-bar linkage of the first to fourth secondary linkage arms 21, 22, 23, 24 upwards and downwards in the direction shown by arrow A in FIG. 4. The geometric configuration of the above-described Peaucellier-Lipkin linkage is such that the point of the pivotal connection 30 of the first and fourth linkage arms 21, 24 moves linearly.

A connecting arm 31 is pivotally connected at a first end to the pivotal connection 30 of the first and fourth linkage arms 21, 24 and is pivotally connected at a second end to a rearward point on the support arm 12. By means of the above-described mechanism, it will be appreciated that as the actuator 28 powers the driver arm 27 to move the four-bar linkage of the first to fourth secondary linkage arms 21, 22, 23, 24 upwards and downwards in the direction shown by arrow A in FIG. 4, the rearward end of the support arm 12 is thereby also moved upwards and downwards. It will also be appreciated that as the actuator 28 is powered to cause the rearward end of the support arm 12 to move upwards and downwards, the forward end of the support arm 12 moves about the first linkage 13 in both rotational and translational manner so as to move in both a downwards direction and a forwards direction shown by arrows B and C respectively in FIG. 4.

Figure 9:
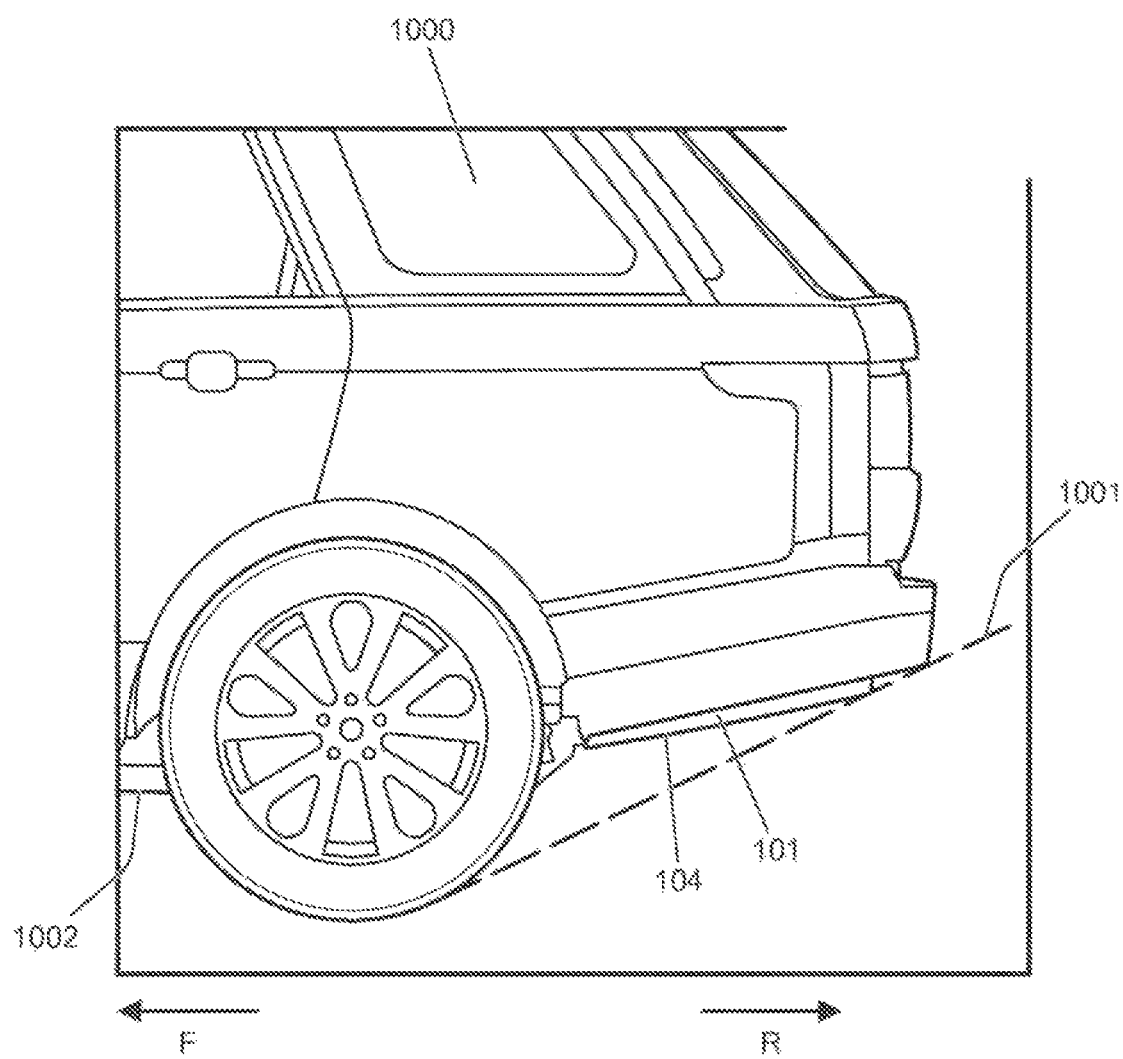
FIG. 9 shows a side view of a vehicle in accordance with an embodiment of the invention, showing an active diffuser in a retracted position.
Figure 10:
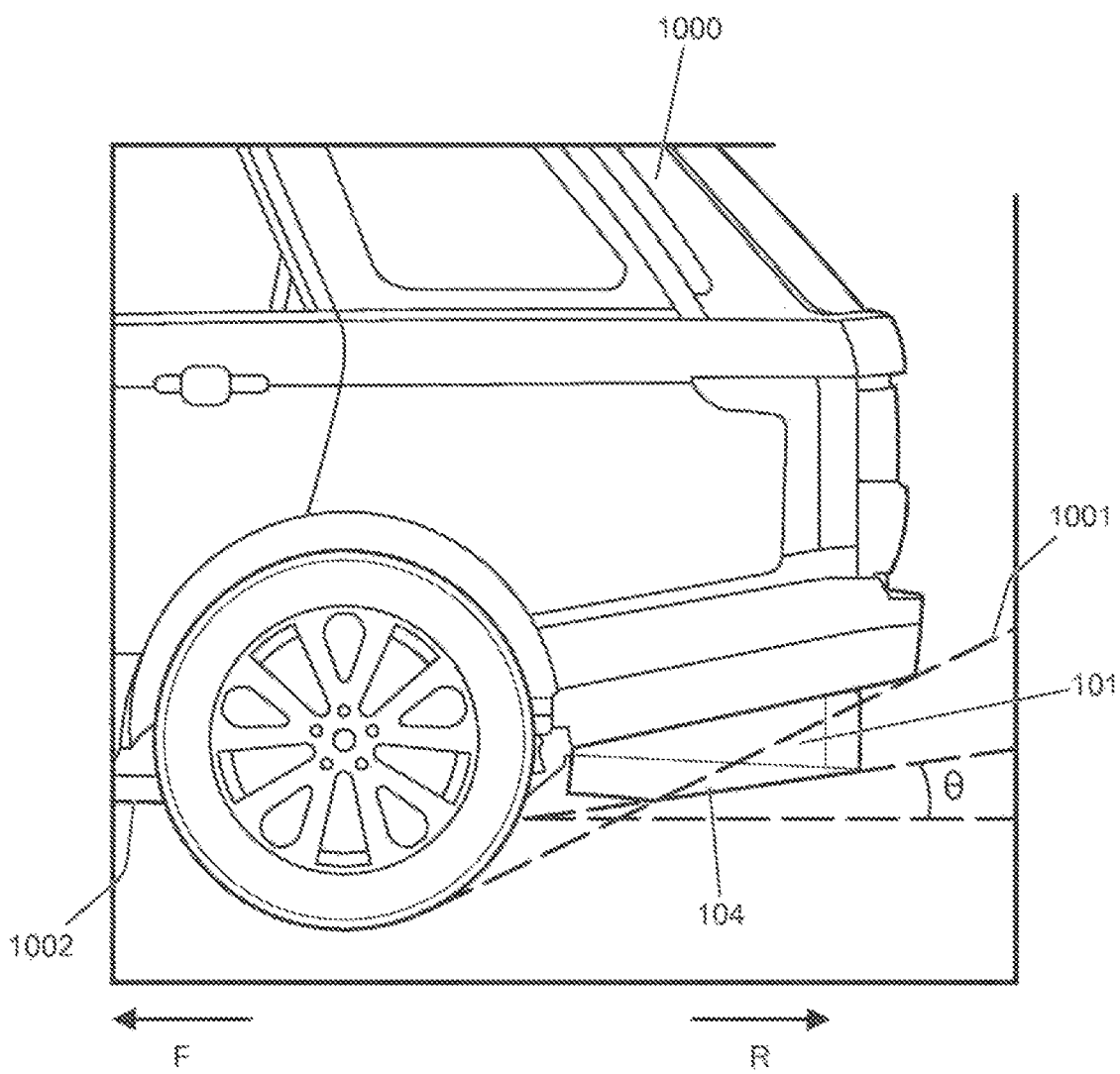
FIG. 10 shows a side view of the vehicle of FIG. 9 with the active diffuser in a deployed position.

In use, the mounting mechanism 11 is part of an active diffuser assembly 100, connected to a vehicle 1000, to enable the diffuser body 101 to move between a stowed position and a deployed position. These respective positions are illustrated in FIGS. 9 and 10 on a vehicle 1000 which is designed for both road and off-road use. In an off-road use mode of the vehicle 1000, it is desirable to have the diffuser body 101 stowed closely against the rear bodywork of the vehicle 1000, as shown in FIG. 9. In the stowed position, the vehicle 1000 is able to ascend or descend steep hills as the diffuser body 101 does not extend below the vehicle's designed departure angle (shown as line 1001 in FIG. 9) defined as a straight line extending tangentially from the rear tyre to where it meets the lower-most point of the rear underside of the body of the vehicle 1000. This also avoids the diffuser body 101 (and connected active diffuser mechanism 10) being damaged by impact with protruding rocks, logs or other obstacles the vehicle 1000 may encounter when travelling on off-road terrain. Yet further, it is desirable for the diffuser body 101 to be in the stowed position when the vehicle 1000 is parked or operating at low speeds, particularly in urban environments, to maintain the design aesthetics and contour lines of the vehicle body when the diffuser body 101 is not functionally required. Furthermore, it may be desirable to retract the diffuser body 101 into the stowed position to generally make active diffuser assembly less vulnerable in more common urban use scenarios, such as to avoid kerb strikes, such as in carparks, driving onto and/or off steep driveways, and driving over speed bumps. In this manner, it is envisaged that the active diffuser assembly may be utilised in a range of different vehicle types, and may particularly also be advantageous in vehicles with generally lower ground clearance.

In a road use mode, where steep ascents or significantly protruding obstacles will not be encountered, it is desirable to have the diffuser perform its intended aerodynamic function to reduce drag. Therefore, in road use mode, the diffuser is moved to a deployed position as shown in FIG. 10, in which it extends downwardly towards the road further than in the stowed position. An airflow surface 104 of the diffuser body 101 is the lower, ground-facing surface of the diffuser body 101. In the deployed position, the airflow surface 104 is intended to guide underbody airflow from an underside surface 1002 of the vehicle 1000 through to the rear end of the vehicle 1000. Thereby, airflow passing across the underside surface 1002 of the vehicle 1000 remains attached to the airflow surface 104 of the diffuser body 101 to modify the aerodynamic wake, increasing pressure on the rear surfaces of the vehicle and thereby reduce drag.

To optimise attachment of airflow to the airflow surface 104, the leading edge 102 of the diffuser body 101 is closely positioned to the rearmost edge of the underside surface 1002 of the vehicle 1000. That is, the leading edge 102 of the diffuser body 101 is closely positioned to the rearmost edge of the underside surface 1002 in a longitudinal direction. This can be seen in the enlarged schematic view of FIG. 12. The leading edge 102 of the diffuser body 101 may be in contact the rearmost edge of the underside surface 1002, or may be slightly spaced therefrom. Advantageously the leading edge 102 of the diffuser body 101 is less than 10 mm from the rearmost edge of the underside surface 1002 in the deployed position.

Figure 12:
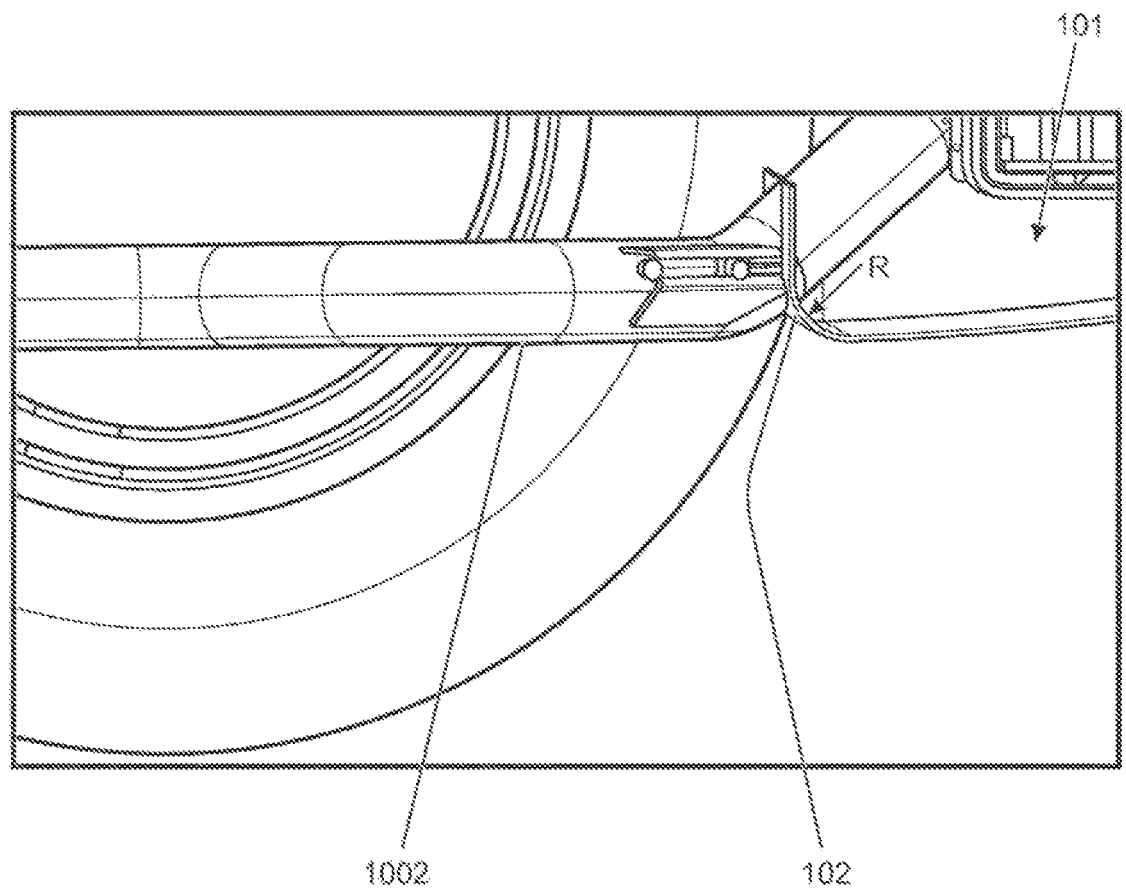
FIG. 12 shows a close up schematic side view of the vehicle of FIGS. 9 to 11 with the active diffuser in the deployed position.

As can also be seen from FIG. 12, in a vertical direction, the airflow surface 104 at the leading edge 102 of the diffuser body 101 flush with the underside surface 1002. Again, this is to optimise attachment of airflow to the airflow surface 104. The airflow surface 104 at the leading edge 102 of the diffuser body 101 may be slightly underflush (that is, slightly higher) than the underside surface 1002, and advantageously is less than around 5 mm underflush to maintain optimum airflow attachment to the airflow surface 104. The airflow surface 104 at the leading edge 102 of the diffuser body 101 is advantageously not overflush (that is, lower) than the underside surface 1002, so that the leading edge 102 of the diffuser body 104 does not to present a forward-facing step. Additionally, the leading edge 102 of the diffuser body may advantageously include a relatively large radius (see radius arrow "R" in FIG. 12). This may be particularly beneficial in the event that the vehicle 1000 underside surface 1002 does not include an undertray interfacing with the diffuser body 101. Such a large leading edge radius R encourages robust re-attachment of air flow over the airflow surface 104 of the diffuser body 101 and discourages flow of air from passing above the diffuser 101. Such radius R may advantageously be around 50 mm, and may advantageously be of a minimum of 20 mm to achieve the above-mentioned beneficial effects.

The above-described movement of the diffuser body 101 (being attached to the support arm 12) moving from the stowed position to the deployed position in both a downwards direction and a forwards direction shown by arrows B and C, helps towards ensuring the diffuser body 101 moves into the required close alignment with the underside surface 1002 described above in the deployed position.

Figure 7:
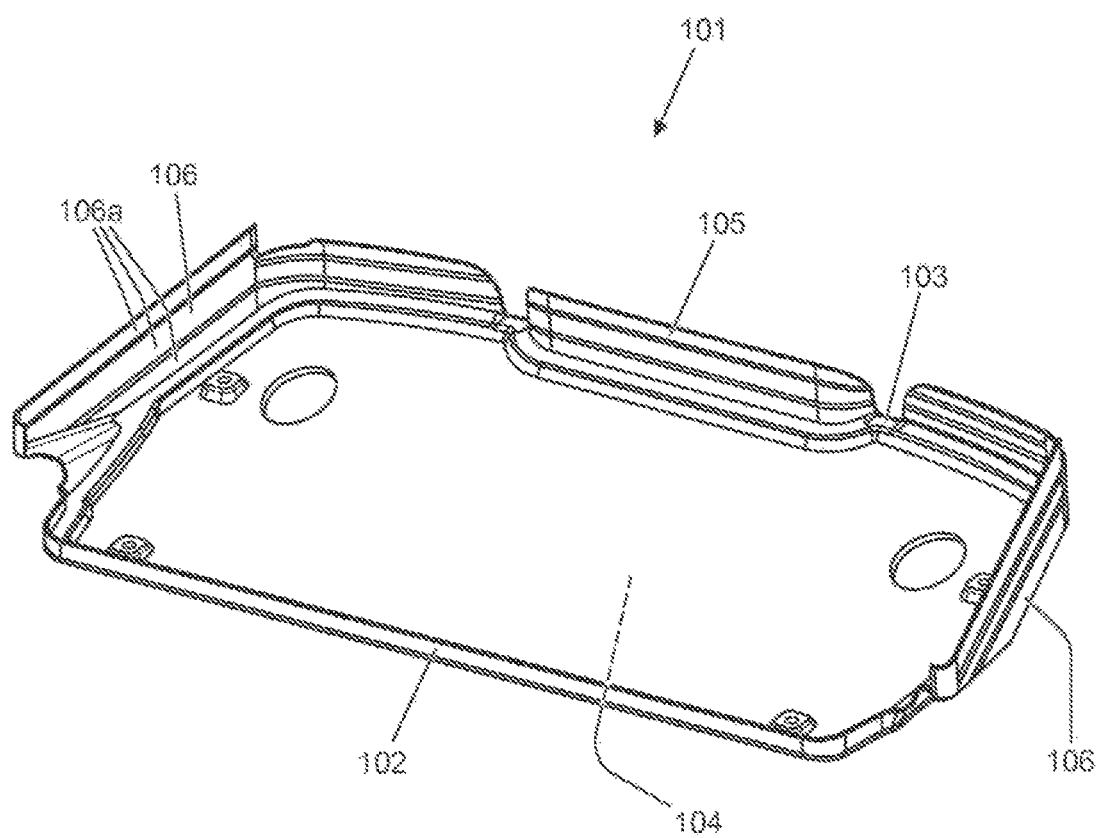
FIG. 7 shows a perspective view of a diffuser body of the active diffuser assembly of FIGS. 1 to 3.

The diffuser body 101 includes an end surface 105 and side surface 106 which join the diffuser body 101 to the rear bumper of the vehicle 1000. In one embodiment shown in FIG. 7, the end and side surfaces 105, 106 are collapsible and are constructed as overlapping plates 106a which can concertina together when the diffuser body 101 is in the stowed position, but can separate and form extended end and side surfaces 105, 106 when the diffuser body 101 is in the deployed position. Thereby, the side and end surfaces 105, 106 provide a continuous closed body surface of the vehicle 1000 when in the deployed position.

Figure 8:
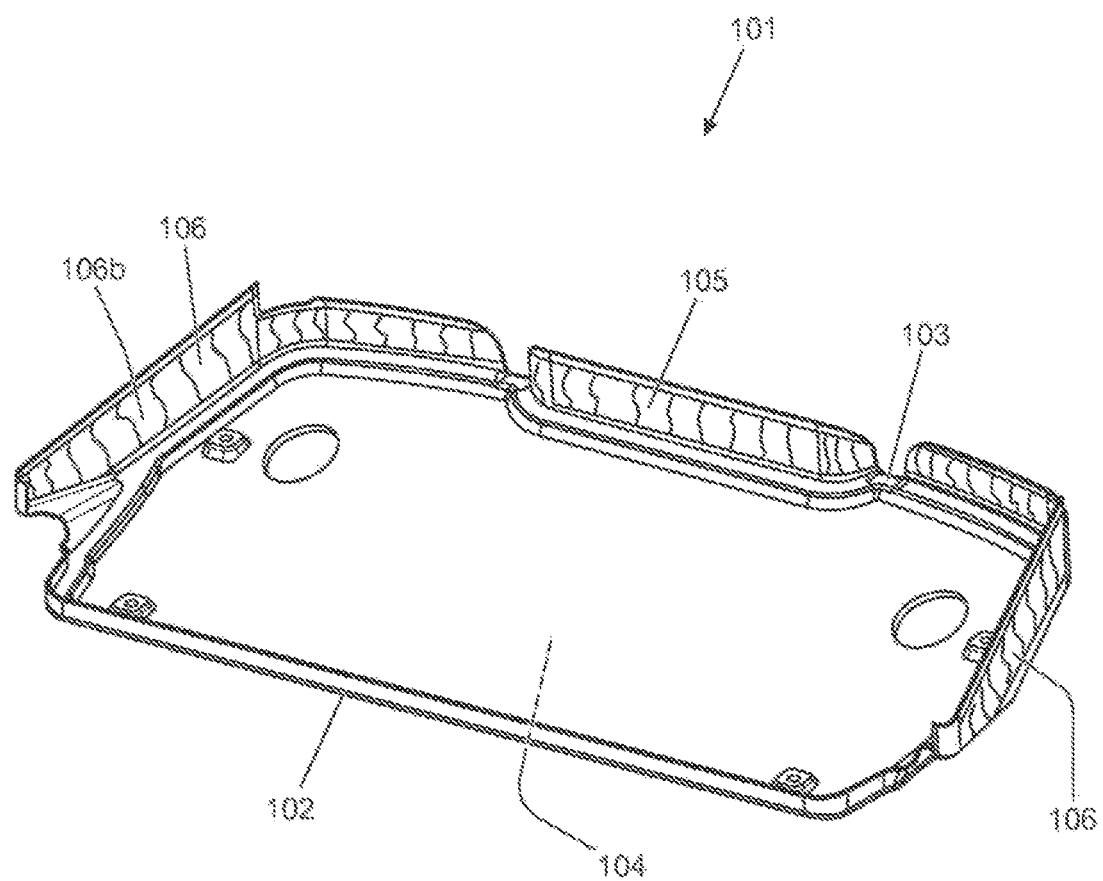
FIG. 8 shows a perspective view of a diffuser body of another embodiment of the invention which may be used in the active diffuser assembly of FIGS. 1 to 3.

In another embodiment shown in FIG. 8, the end and side surfaces 105, 106 are also collapsible, but instead are constructed from a flexible material 106b that can fold when the diffuser body 101 is in the stowed position, but can unfold into straight walled end and side surfaces 105, 106 when the diffuser body 101 is in the deployed position. Thereby, the side and end surfaces 105, 106 provide a continuous closed body surface of the vehicle 1000 when in the deployed position.

In an alternative embodiment, the end and side surfaces 105, 106 are rigid walls and instead of being collapsible when the diffuser body moves into the stowed position, are instead received within slots or otherwise appropriately shaped spaces within the rear bumper of the vehicle 1000. Again, the side and end surfaces 105, 106 provide a continuous closed body surface of the vehicle 1000 when in the deployed position.

To optimise aerodynamic performance of the diffuser body 101, the side walls 106 lie flush with the outboard face of the vehicle wheel and tyre when the diffuser body 101 is in the deployed position. This configuration can be seen in FIG. 11. The enables reattachment of the airflow passing the side of the vehicle 1000 aft of the vehicle wheels, thereby reducing drag. In an embodiment, a vertical step feature may be provided, for example a "separation edge" may be added at an aerodynamically optimised location to cleanly separate the airflow and further reduce drag.

Figure 11:
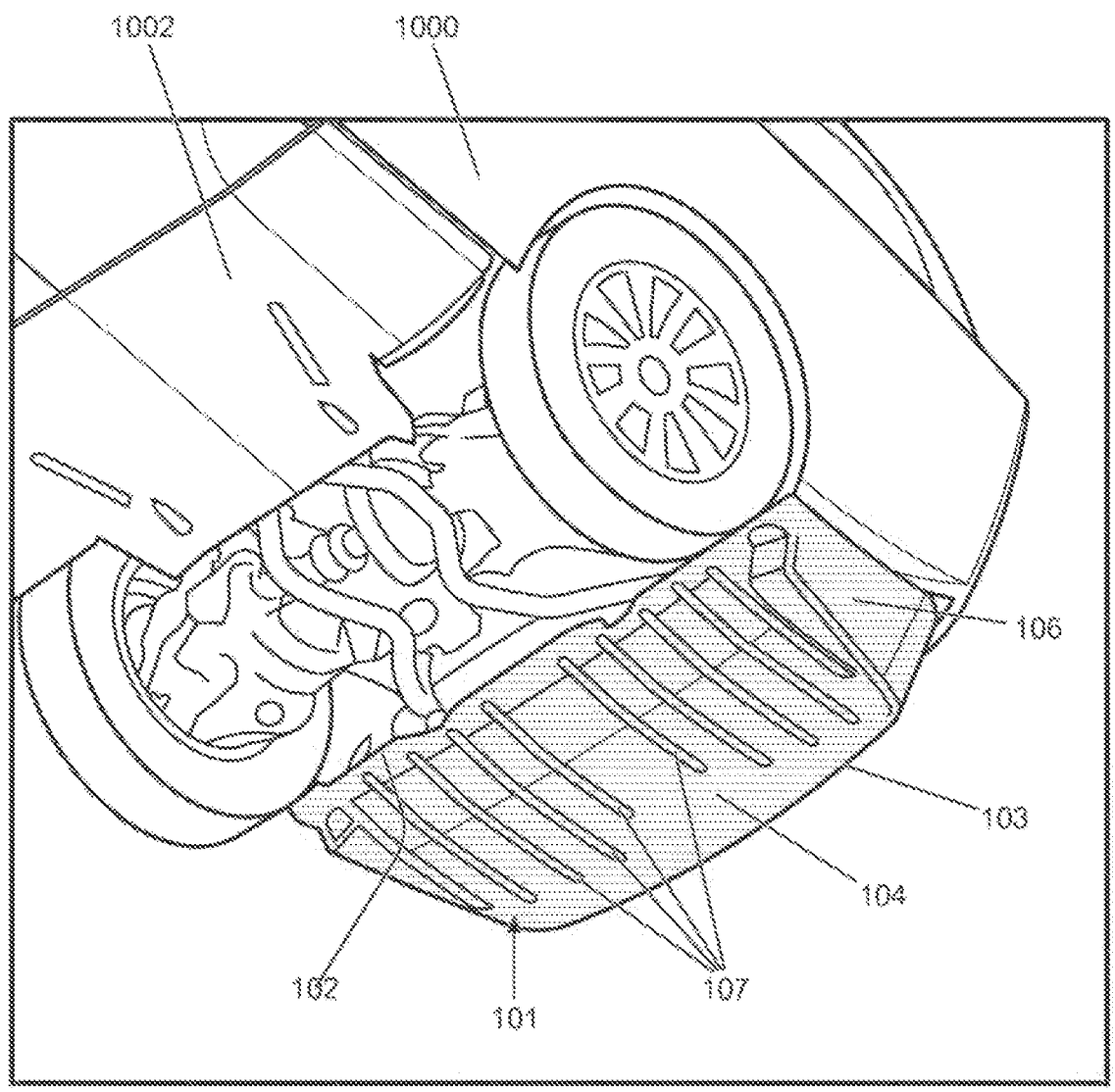
FIG. 11 shows a perspective underside view of the vehicle of FIGS. 9 and 10 with the active diffuser in the deployed position.

A further advantageous aerodynamic feature of the airflow surface 104 is a plurality of longitudinal strakes 107, as can be seen in FIG. 11. These strakes 107 advantageously extend downwards from the airflow surface 104, and are positioned across the transverse width of the airflow surface 104, and are advantageously provided at the inboard edge of the rear wheel well, the inboard face of the rear tyres, and at the outer side edges of the diffuser body 101.

Figure 5:
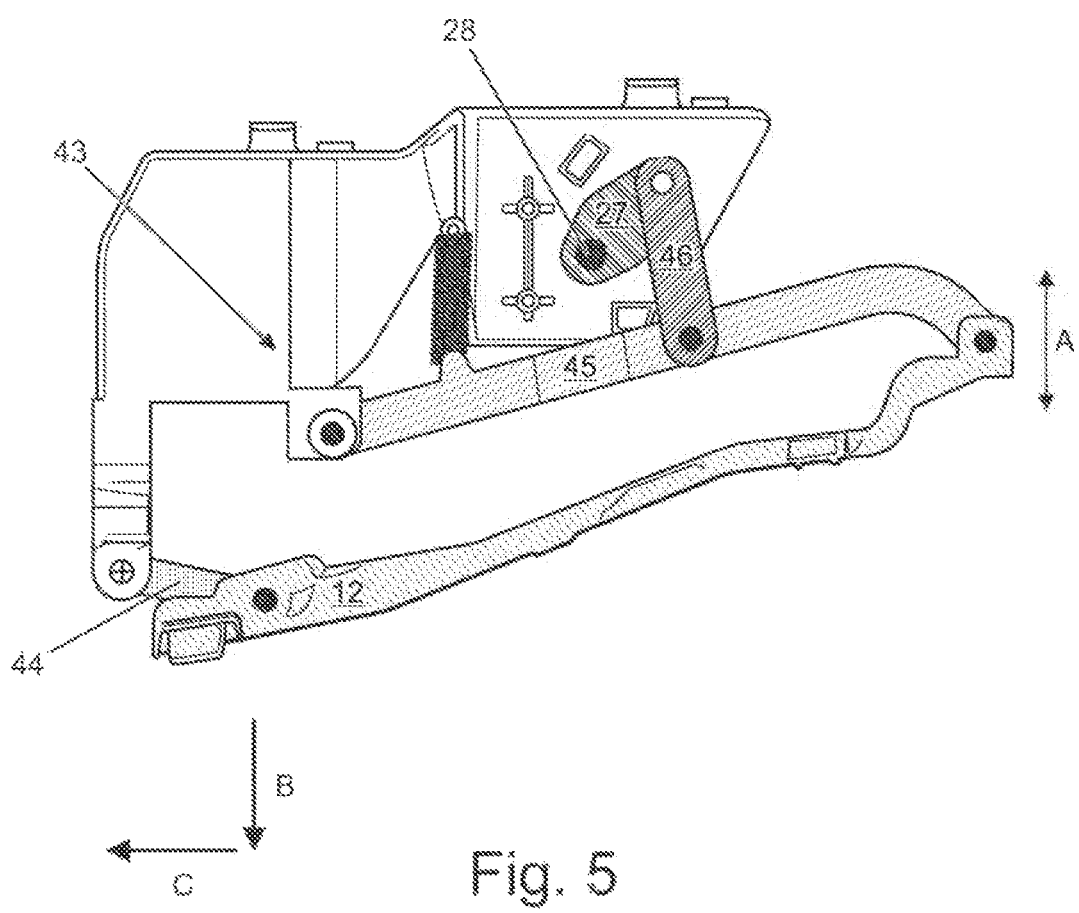
FIG. 5 shows a schematic side view of an active diffuser mechanism of another embodiment of the invention.

FIG. 5 shows an alternative embodiment of mounting mechanism 11 to that described above and shown in FIG. 4. Like features in common with the mounting mechanism 11 shown in FIG. 4 retain the same reference numerals. The alternative mechanism 11 shown in FIG. 5 comprises a linkage 43 coupling the diffuser body 101 to the body of the vehicle 1000. The support arm 12 comprises a first linkage arm of the linkage 43. A second linkage arm 44 has a first end pivotally connected to the support arm 12 proximate the leading edge 102 of the diffuser body 101. A second end of the second linkage arm 44 is pivotally connectable to the body of the vehicle 1000, either directly or by means of a connecting bracket (not shown). A third linkage arm 45 has a first end pivotally connected to the support arm 12 proximate the trailing edge 103 of the diffuser body 101. A second end of the third linkage arm is pivotally connectable to the body of the vehicle 1000, either directly or by means of a connecting bracket (not shown), which may be the same connecting bracket the second end of the second linkage arm 44 is connected to, or may be a separate connecting bracket. The second ends of the second and third linkage arms 44, 45 are fixed relative to each other.

The support arm 12, second and third linkage arms 44, 45 and the bracket(s) or vehicle body to which the second and third linkage arms 44, 45 are connected, thereby form a four-bar linkage arrangement by which the diffuser body 101 can be connected to the body of a vehicle 1000.

A first end of a driver arm 27 is connected to a rotary actuator 28. A second end of the driver arm 27 is connected to a first end of a crank arm 46. A second end of the crank arm 46 is connected to the third linkage arm. The actuator 28 can thereby power the driver arm 27 to move the four-bar linkage of the support arm 12 and second and third linkage arms 44, 45 upwards and downwards in the direction shown by arrow A in FIG. 5.

By means of the above-described mechanism, it will be appreciated that as the actuator 28 powers the driver arm 27 to move the four-bar linkage of the support arm 12 and second and third linkage arms 44, 45 upwards and downwards in the direction shown by arrow A in FIG. 5, the support arm 12 is thereby also moved upwards and downwards. It will also be appreciated that as the support arm 12 moves upwards and downwards, the configuration of the second linkage arm 44 is such that the forward end of the support arm 12 moves in both rotational and translational manner so as to move it and the attached diffuser body 101 in both a downwards direction and a forwards direction shown by arrows B and C respectively in FIG. 5.

In use, the mounting mechanism 11 of the embodiment of FIG. 5 is part of an active diffuser assembly 100, connected to a vehicle 1000, as described above with reference to the mounting mechanism 11 of FIG. 4, and with the same purpose, technical function and advantageous properties. Therefore, detailed description of these aspects will not be repeated.

For both embodiments of mounting mechanism 11 shown in FIGS. 4 and 5, it will be appreciated that all of the support arm, linkages, linkage arms, driver arms and crank arm move in straight lines, and all lie in parallel planes, and all of these planes extend substantially vertically and are closely spaced together. Accordingly, the transverse space which each mounting mechanism occupies on a vehicle is narrow, making packaging of the mechanism 11 within the vehicle space-efficient. This is illustrated in the rear view of the active diffuser assembly of FIG. 3 in which the narrow transverse space occupied by the mounting mechanisms is illustrated by boxes "S".

In addition to the above, the pivot axes of the various pivotal connections between the support arm, linkages, linkage arms, driver arms, crank arm and vehicle body or mounting bracket(s) all lie parallel to each other. This again contributes to providing a space-efficient mounting mechanism as all movement of the components of the mounting mechanisms occurs within a narrow transverse space with respect to the width of the vehicle body.

When the active diffuser assembly 100 is in the deployed position, the airflow surface 104 is closer to the road or ground than when in the stowed position. The diffuser body 101 is therefore more prone to damage from impact with road debris or if the vehicle 1000 is accidentally driven into a stationary obstacle which may impact the diffuser body 101. In such an impact situation, the force of the impact would be transmitted via the mounting mechanism 11 to the rotary actuator 28 which could risk damage to the rotary actuator 28. To mitigate this risk of damage, the active diffuser mechanism 10 includes a shock protection mechanism 32 disposed between the diffuser body 101 and the actuator 28 which is configured to absorb shock forces transmitted from impact of the diffuser body 101. In the embodiments shown in FIGS. 4 and 5, the impact protection mechanism 32 comprises a clutch which is disposed at the rotary actuator 28. The clutch is disposed between a rotary output shaft of the rotary actuator 28 and the driver arm 27. The clutch may be of various suitable configurations, and may, for example, comprise concentric frictionally-engaging rings or frictionally-engaging clutch plates, either of which may be sprung biased into engagement. In the event of an impact on the diffuser body 101, the force of the impact transmitted through the mounting mechanism 11 would cause the clutch to slip rather than force movement of the a rotary output shaft of the rotary actuator 28, thereby helping prevent damage to the rotary actuator 28.

It is envisaged within the scope of the invention that alternative configurations of shock protection mechanisms may be provided other than, or additional to the clutch-type arrangement described above. Such alternative shock-protection mechanism may comprise a sprung piston or damper disposed between the diffuser body 101 and the rotary actuator 28. Such a piston or damper may replace or be incorporated into one of the linkage arms of the mounting mechanism 11. For example, in the mounting mechanism 11 of FIG. 4, the connecting arm 31 may comprise a compressible piston or damper to absorb impact forces. Alternatively, the driver arm 27, or any of the secondary Peaucellier linkage arms 21-24 may comprise a compressible piston or damper. In the mounting mechanism of FIG. 5, the crank arm 45 and/or the second linage arm 44 may comprise a compressible piston or damper.

Figure 6A:
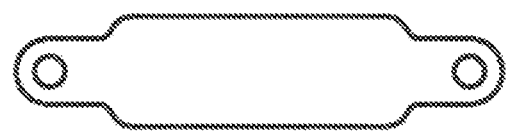
FIGS. 6A to 6C show a side view of various different dimension of linkage arms which may be used in the active diffuser mechanisms of any of FIGS. 1 to 5.
Figure 6B:
Figure 6C:
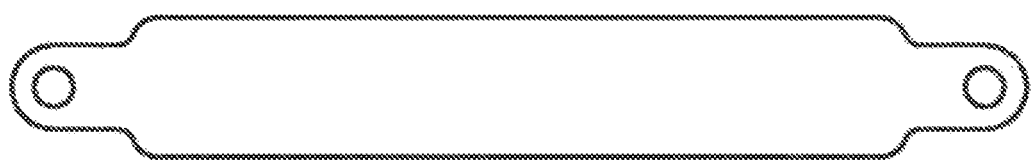

An advantage of embodiments of mounting mechanisms 11 of the invention is that the overall configuration of mounting mechanisms 11 may be applicable to different shapes and sizes of vehicles. Minor modifications to the mounting mechanisms 11 may be made in order that the mounting mechanisms 11 may be sized and configured for use on vehicles of different dimensions. For example, an SUV may require a diffuser body 101 to move over a larger distance between the stowed and deployed positions than, say, a corresponding diffused body installed on a saloon car. To enable mounting mechanisms of embodiments of the invention to achieve such flexibility of application, one or more of the various linkage components may be simply replaced with a corresponding component of different length or dimension. For example, if the mounting mechanism 11 of FIG. 4 is to be used in a vehicle in which the diffuser body 101 is to move a shorter distance between the stowed and deployed positions, the first and second main linkage arms 17, 18 may be exchanged for shorter first and second main linkage arms. The actuator 28 may therefore be mounted in an alternative location relative to the support bracket 19, or alternatively or in addition, a correspondingly shorter driver arm 27 may be installed in the mounting mechanism 11. To afford such flexibility of application, it will be appreciated that any of the linkage arms may be replaced as required, so alternative length secondary linkage arms 21-24, connecting arm 31, second and third linkage arms 44, 45 and/or crank arm 46 may be provided and installed in the mounting mechanisms 11 to alter the distance of movement between stowed and deployed positions and/or angle of the airflow surface 104 in each position. An example of different lengths of linkage arms is shown in FIGS. 6A to 6C. These may be different configurations of first and second main linkage arms 17, 18, but as mentioned above, various different dimensions of linkage arms or other mechanism components may also or alternatively be provided.

It will be appreciated that the mounting mechanisms 11 may be configured such that in the deployed position, the airflow surface 104 of the diffuser 101 lies at a predetermined angle with respect to the horizontal to achieve optimum aerodynamic performance and to retain airflow attachment. As shown in FIGS. 10 and 12, this angle is indicated as $\theta$, and may advantageously be in the region of 4 to 15 degrees, and may advantageously be around 10 degrees.

Figure 13:
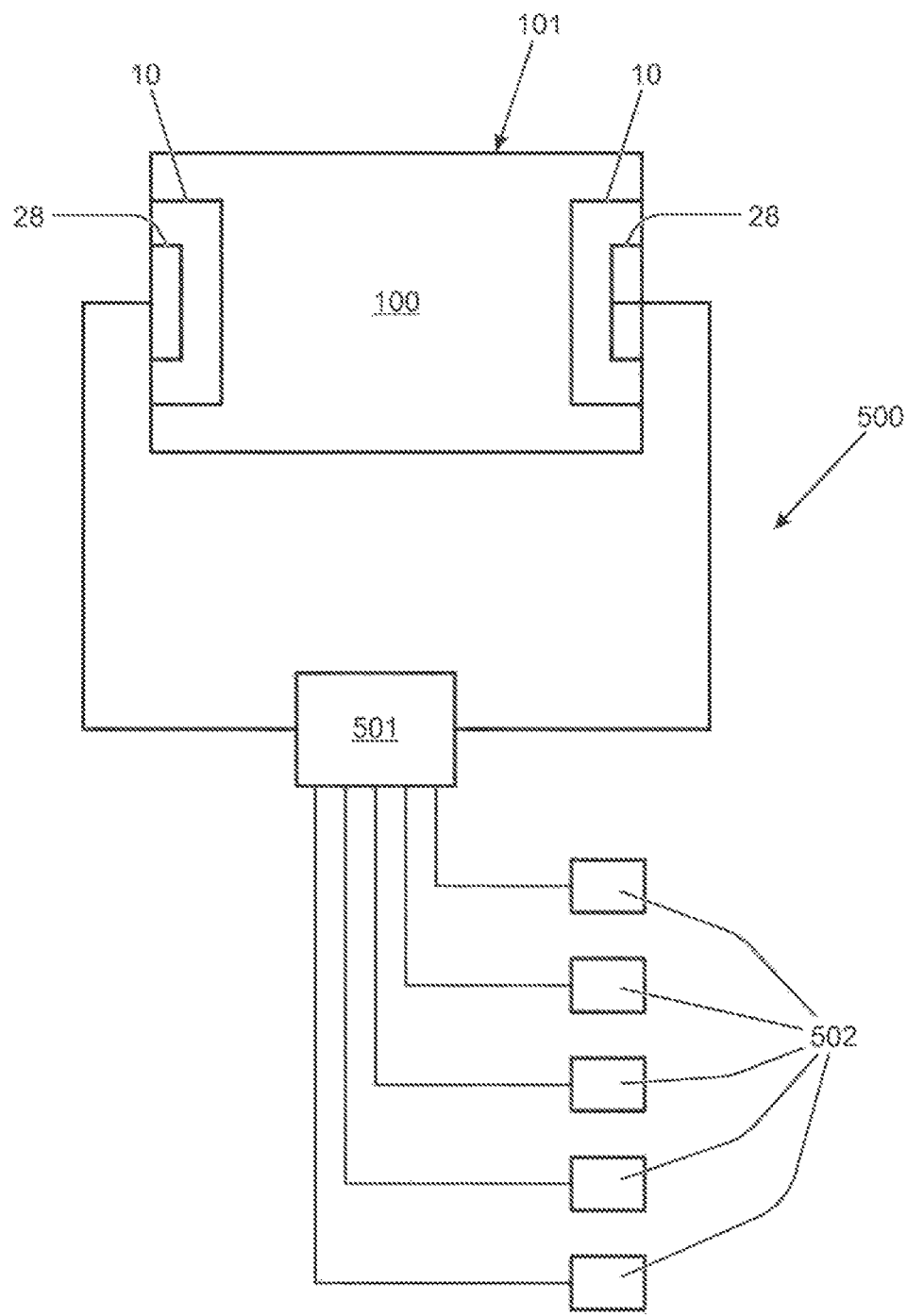
FIG. 13 shows a schematic view of a control system of an active diffuser system for controlling operation of an active diffuser assembly of an embodiment of the invention.

In order to control actuation of the mounting mechanism 11, active diffuser mechanism 10, active diffuser assembly 100 and active diffuser system, a control system 500 is provided within the scope of the invention, and is schematically illustrated in FIG. 13. The control system 500 comprises a controller 501, which includes a processor and a memory. The controller 501 is connected to the actuators 28 of each active diffuser mechanism 10 disposed on each transverse side edge of the diffuser body 101. The controller 501 is configured to control operation of the actuators 28 by sending control signals thereto.

The control system 500 includes a plurality of sensors 502 which are connected to the controller 501 and are configured to send respective sensor signals to the controller 501 indicative of the relevant sensed parameter the respective sensor 502 is configured to detect. The controller 501 is configured to control operation of the actuators 28 in dependence on the received sensor signal. However, it is intended within the scope of the invention that the control system 500 may include only one sensor 502, or be entirely manually operated and so include no sensors. In the control system 500 shown in FIG. 13, a plurality of sensors 502 are provided which include a speed sensor, a vehicle angle sensor, an accelerometer, a parking brake sensor and a reverse gear sensor. The or each speed sensor may comprise wheel speed sensor(s). It is intended that other sensors 502 maybe provided and connected to the controller 501 to effect operation of the actuators 28. Additionally, the controller 501 may be configured to detect various vehicle settings or other operational parameters to effect operation of the actuators 28 to ensure the diffuser body 101 is deployed or stowed as appropriate. Such vehicle settings or sensors may include, but are not limited to, detecting an off-road setting (e.g. terrain response) and to ensure the diffuser is in the stowed position when off-road setting is selected; wade sensing—to ensure the diffuser is retracted into the stowed position when it is sensed that the vehicle is wading, or a wade mode is selected; a manual deploy/stow function—usable for cleaning/maintenance when vehicle transmission is set to "park"; an anti-trap system (which may be a speed sensor for the actuator 28 and a controller that detects a reduction in the speed of the actuator 28 and reverses its direction) active when vehicle transmission is set to "Park"; and a GPS sensor which is configured to provide a signal to the controller 501 to inhibit deployment and/or trigger retraction if the GPS sensor indicates that the vehicle has left metalled, paved or sealed roads. Furthermore, the control system 500 may include a warning to inform the driver of any failure to retract. Additionally, the vehicle may comprise a tow sensor which is configured to detect if a trailer or any other accessory or device is attached to a tow bar of the vehicle, and prevent deployment of the diffuser body 101 if a trailer or any other accessory or device is attached to the tow bar. Additionally, the vehicle may comprise one or more a ride height sensors which are configured to detect vertical displacement of the vehicle for each corner of car. The controller 501 may be configured to process signals from the ride height sensors with respect of time to determine a road surface condition (e.g. if frequent and varied ride height changes are detected, the controller 501 may determine the vehicle is travelling on uneven or rough terrain, and so prevent deployment of the diffuser body 101, ensuring it remains in the stowed position. The controller 501 may further be configured to prevent actuation of the diffuser body between deployed and stowed positions when the vehicle is travelling above a predetermined threshold speed detected by one or more speed sensors, when cornering above a predetermined threshold detected lateral acceleration, or rapidly accelerating or decelerating, as detected by one or more acceleration sensors, to optimise vehicle stability The control system 500 is configured to operate the active diffuser mechanism 10 at certain threshold speed values. The control system 500 is configured to move the diffuser body 101 into the deployed position when a sensor signal is received from the speed sensor indicating the vehicle speed exceeds a first threshold value. Similarly, the control system 500 is configured to move the diffuser body 101 into the stowed position when a sensor signal is received from the speed sensor indicating the vehicle speed is less than a second threshold value. The first and second threshold values may be different or may be the same. For example, the diffuser body 101 may move into the deployed position when the vehicle speed exceeds 50 kph, and the diffuser body 101 may be moved back into the stowed position when the vehicle speed is less 30 kph. Alternatively, the diffuser body 101 may move into the deployed position when the vehicle speed exceeds 50 kph and may be moved back into the stowed position when the vehicle speed is less 50 kph. The diffuser body 101 may be controlled to move into the deployed position after a predetermined period of time has elapsed since the vehicle speed exceeded, and remains in excess of, the first threshold value. Additionally, the diffuser body 101 may be controlled to move into the deployed position after a predetermined distance has been travelled by the vehicle since the vehicle speed exceeded, and remains in excess of, the first threshold value.

The control system 500 is configured to prevent movement of the diffuser body 101 when a sensor signal is received from the speed sensor indicating the vehicle speed exceeds a third threshold value. This may be advantageous to avoid damage to the mechanism or actuator 28 by operation at a time when larger aerodynamic forces are being exerted on the airflow surface 104. For example, movement of the diffuser body 101 may be prevented if the vehicle speed exceeds 100 kph. The various threshold values of speed and other parameters mentioned hereafter may be pre-programmed and stored in the memory of the controller 501.

The control system 500 is configured to move the diffuser body 101 into the stowed position when a sensor signal is received from the vehicle angle sensor 502 indicating the vehicle 1000 is travelling off-road or on rough terrain. This may be determined by the controller receiving vehicle angle signals indicating that the vehicle angle is changing frequently (indicative of travelling over uneven terrain). This is advantageous to avoid damage to the diffuser body 101 or active diffuser mechanism 10 by obstacles or protruding terrain features when the vehicle is travelling off-road.

The control system 500 is configured to move the diffuser body 101 into the stowed position when a sensor signal is received from the parking brake sensor or reverse gear sensor indicating the vehicle 1000 is parked or is in reverse. This is advantageous to avoid damage to the diffuser body 101 or active diffuser mechanism 10 if the vehicle 1000 strikes an obstacle while reversing, and also to maintain the aesthetic profile of the vehicle 1000 when the vehicle is parked and the active diffuser is not functionally required.

The control system 500 includes an override switch as one of the sensors 502 to enable a user to manually operate the actuators 28 to move the diffuser body 101 into the deployed or stowed positions independently of any sensed speed or terrain parameters. This may be advantageous for servicing, cleaning or other maintenance which may require the diffuser body 101 to be in the deployed position to access the components to be serviced. Such service mode deployment may be actuated from a controller of the vehicle 1000 when the vehicle is undergoing routine servicing and maintenance.

It will be appreciated from the above that mounting mechanisms 11 of invention allow movement of a diffuser body 101 from a stowed position to a deployed position, in which the diffuser body 101 lies and a shallower angle relative to the ground/horizontal plane than in the stowed position, and in which the diffuser body 101 is disposed further forward than in the stowed position, to align with a vehicle rear underside for aerodynamic performance. Such movement between stowed and deployed positions is afforded by the mounting mechanisms 11 to simultaneously achieve both rotational and translational movement in a single range of motion with a single mechanism. This avoids complications of achieving translation and rotation of a diffuser body separately with separate rotational and translational mechanisms, which would be more complicated, expensive and heavier. Having separate rotational and translational mechanisms would also make control of diffuser more complicated because the separate mechanisms (i.e. a rotational system and a translational system) would need to be independently controlled whereas in mechanisms of the present invention, a single actuator can achieve actuation of the active diffuser mechanism over the entire intended range of movement of the diffuser body 101.

In embodiments of active diffuser mechanisms of the present invention, points at both the leading and trailing areas of the diffuser body 101 may both rotate and translate during movement between the stowed and deployed positions. However, in alternative embodiments of active diffuser mechanisms of the present invention, a point at a leading edge of the diffuser body 101 may both rotate and translate during movement between the stowed and deployed positions, and a point at a trailing edge of the diffuser body 101 may only translate during movement between the stowed and deployed positions, for example move linearly vertically only. Such a movement may be achieved if, for example, in the mounting mechanism of FIG. 4, the connecting arm 31 is rigidly attached to both the support arm 12 and the first and fourth secondary linkage arms 21, 24, or indeed if the connecting arm 31 is omitted entirely and the support arm 12 is connected directly to the pivotal connection 30 of the first and fourth secondary linkage arms 21, 24. All such alternative configurations of active diffuser mechanism 10 are intended within the scope of the present invention.

Figure 14:
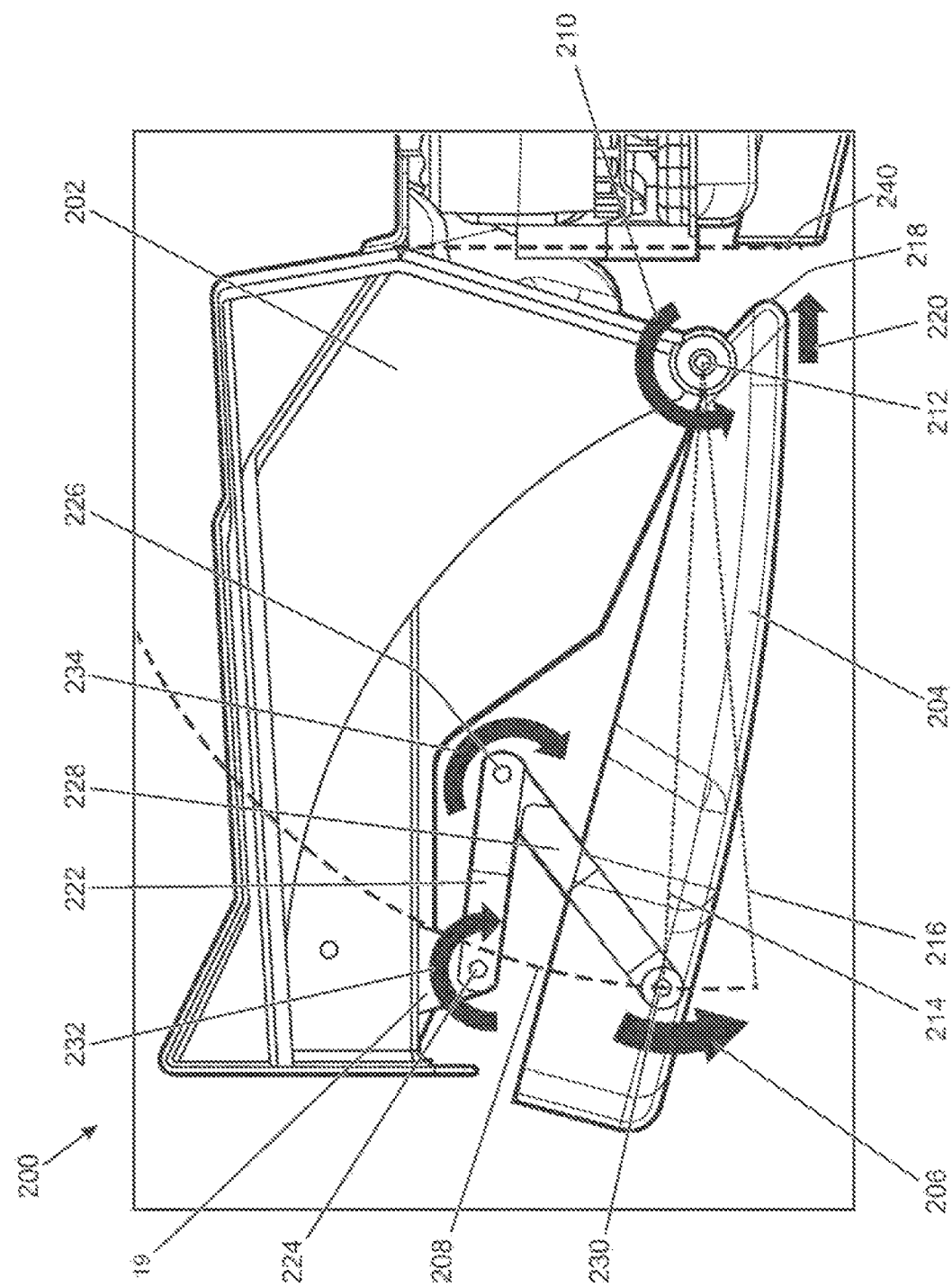
FIG. 14 shows a schematic side view of an active diffuser mechanism of another embodiment of the invention.

FIG. 14 shows an active diffuser mechanism 200 according to an embodiment of the invention. The diffuser mechanism comprises a diffuser body 204 coupled through a first linkage means to the body of the vehicle 202 through a mounting bracket 19. Movement about arrow 206 of the diffuser body 204 about an arc 208 is provided by rotation 210 of the diffuser body 204 about a lower pivot point 212 coupling proximate to a leading edge 218 of the diffuser body and which is coupled to the body of the vehicle 202. The diffuser is configured to returnably translate from a stowed position 214 to a deployed position 216. During the translation to the deployed position 216, the leading edge 218 of the diffuser body 204 is moved in a forward direction 220. This is advantages in that the deployed diffuser body acts to reduce aerodynamic gaps between the leading edge 218 of the diffuser body 204 and the trailing edge shown by the line 240 in FIG. 14 of other vehicle components, for example the underside surface of the vehicle 1002 as shown in FIGS. 9 to 12.

Movement of the diffuser body is enacted by a mounting mechanism which comprises the coupling at the pivot point 212 and a linkage mechanism comprising a driver arm 222 pivotably coupled through pivot 226 to a crank arm 228 which is in turn pivotably coupled through pivot 230 to the diffuser body 204. The driver arm 222 is coupled to the body of the vehicle 202 through the mounting bracket 19. Rotation of the driver arm as indicated by arrow 232 causes rotation of the crank arm and driver arm with respect to each other as indicated by arrow 234. This rotation extends the vertical distance of the first linkage and drives the diffuser body 204 away from the mounting plate 19. It will be understood that this indicated movement deploys the active diffuser assembly to the deployed position 216 such that the reverse motion stows the active diffuser to the stowed position 214.

Figure 15:
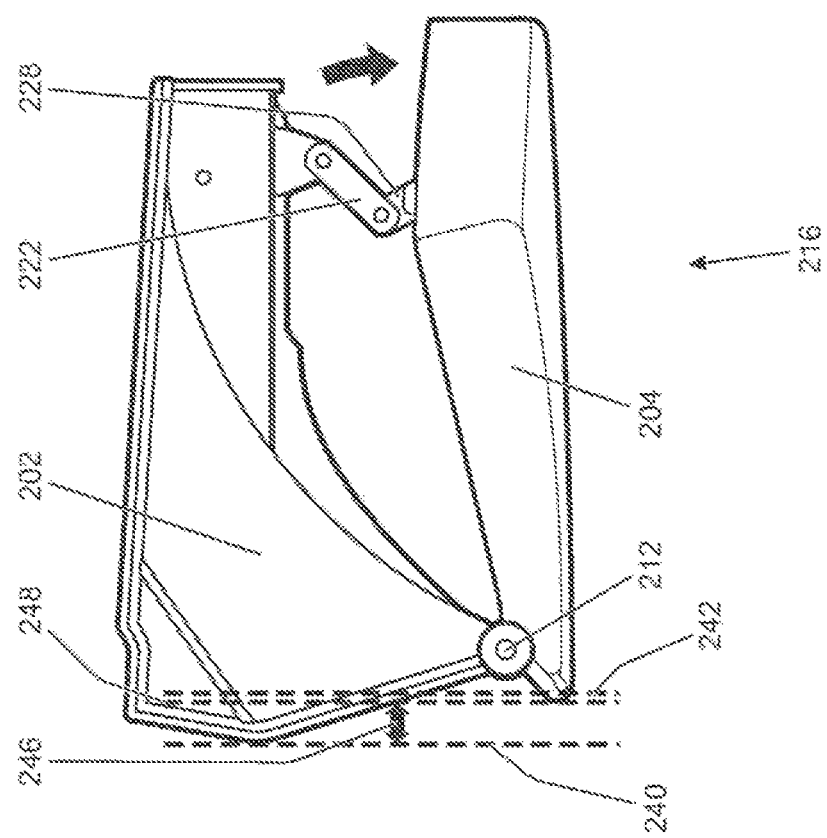
FIG. 15 shows a schematic side view of the active diffuser mechanism of FIG. 14 in a stowed and deployed state.
Figure 15:
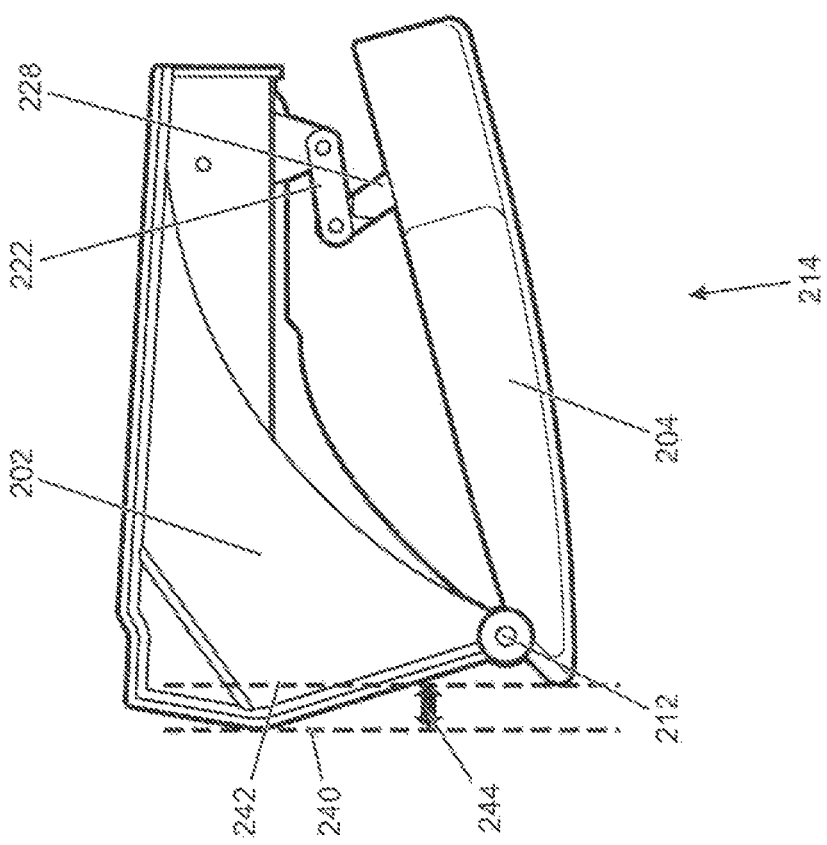

FIG. 15 shows the active diffuser mechanism in the stowed 214 and the deployed 216 positions. Illustrative arrows 244 and 246 indicate the forward motion of the leading edge 218 of the diffuser body 204 during the deployment. In particular the distance 244 in the stowed position 214 between a line 242 taken at the leading edge 218 and the line 240 indicating the trailing edge of forward vehicle components is reduced to a distance 246 between the line 240 indicating the trailing edge of the forward vehicle components and a line 248 taken at the leading edge 218 of the diffuser body 204 in the deployed position.

In embodiments of the invention the aforementioned control system is used with the diffuser of FIGS. 14 and 15 as described above.

Although in the above-described embodiments of active diffuser mechanism 10, the actuators 28 are rotational actuators, it is intended within the scope of the invention that alternative configurations of actuator may be provided, which may be linear actuators as opposed to rotary, and may comprise electrical, hydraulic or pneumatic actuators.

It will be appreciated that various changes and modifications can be made to the present invention without departing from the scope of the present application.

The invention claimed is:

1. An active diffuser assembly for a vehicle comprising:
an active diffuser mechanism and a diffuser body;
wherein the active diffuser mechanism comprises a mounting mechanism for connecting the diffuser body to a body of a vehicle such that the diffuser body is moveable between a stowed position and a deployed position in which an airflow surface of the diffuser body is spaced further away from the body of the vehicle than in the stowed position;
wherein the mounting mechanism comprises:
a linkage mechanism configured to returnably move the diffuser body from the stowed position to the deployed position;
and a coupling proximate to a leading edge of the diffuser body configured such that the leading edge of the diffuser body moves in a forward direction during movement from the stowed position to the deployed position;
wherein the diffuser body comprises a rear surface extending from a trailing edge of the diffuser body and configured, in use, to extend between the body of the vehicle and the trailing edge of the diffuser body when the diffuser body is in the deployed position.

2. The active diffuser assembly according to claim 1 wherein the coupling proximate to the leading edge of the diffuser body is offset from the leading edge of the diffuser body.

3. The active diffuser assembly according to claim 1 wherein the coupling proximate to the leading edge of the diffuser body comprises a pivot.

4. The active diffuser assembly according to claim 1 wherein the coupling proximate to the leading edge of the diffuser body comprises a linkage means comprising a plurality of pivoting linkage arms wherein the pivot axes of the linkage arms all extend parallel to each other and wherein the plurality of pivoting linkage arms all lie in, and are moveable in, parallel planes wherein the coupling is configured to form a four-bar linkage mechanism with the diffuser body such that the diffuser body comprises a first linkage arm of the four-bar linkage, a second linkage arm is pivotally connected to the first linkage arm in the region of a leading edge of the diffuser body, and a third linkage arm is pivotally connected to the first linkage arm in the region of a trailing edge of the diffuser body.

5. The active diffuser assembly according to claim 1 wherein the linkage mechanism comprises a Peaucellier-Lipkin linkage connectable to the diffuser body in the region of a trailing edge of the diffuser body and connectable to the body of the vehicle.

6. The active diffuser assembly according to claim 1 comprising an actuator coupled to the mounting mechanism and operable to move the diffuser body between the stowed and deployed positions.

7. The active diffuser assembly according to claim 6 wherein the actuator comprises a rotary actuator having a drive shaft and a drive arm extending from the drive shaft and connected to the mounting mechanism.

8. The active diffuser assembly according to claim 6 comprising a shock protection mechanism disposed between the diffuser body and the actuator and configured to absorb shock forces transmitted from impact of the diffuser body to prevent damage to the actuator.

9. The active diffuser assembly according to claim 8 wherein the shock protection mechanism comprises a clutch disposed between the actuator and the mounting mechanism.

10. The active diffuser assembly according to claim 9 wherein the shock protection mechanism comprises a damper disposed between the diffuser body and the actuator.

11. The active diffuser assembly according to claim 6 wherein the actuator is coupled to a driver arm of the linkage mechanism.

12. The active diffuser assembly according to claim 1, wherein the diffuser body comprises side surfaces extending from side edges of the diffuser body and configured, in use, to extend between the body of the vehicle and the side edges of the diffuser body when the diffuser body is in the deployed position.

13. The active diffuser assembly according to claim 12, wherein the rear surface and/or the side surfaces are collapsible such that they collapse when the diffuser body moves into the stowed position.

14. An active diffuser system comprising:
the active diffuser mechanism according to claim 6;
a controller connected to the actuator and configured to control operation of the actuator; and
at least one sensor configured to detect at least one parameter of operation of the vehicle and to provide a signal to the controller indicative of the detected parameter;
wherein the controller is configured to control operation of the actuator in dependence on the received signal.

15. The active diffuser system according to claim 14 wherein the at least one sensor comprises a speed sensor and the controller is configured to operate the actuator to move the diffuser body into the deployed position when a signal is received indicating the speed of the vehicle exceeds a first threshold value, wherein the controller is configured to operate the actuator to move the diffuser body into the stowed position when a signal is received indicating the speed of the vehicle is less than a second threshold value.

16. A vehicle comprising a body; and
the active diffuser mechanism according to claim 1.

17. The vehicle according to claim 16 comprising an undertray, and wherein in the deployed position, a leading edge of the diffuser body is less than 10 mm in a longitudinal direction of the vehicle from an adjacent trailing edge of the undertray.

18. The vehicle according to claim 16 comprising an undertray, and wherein in the deployed position, a leading edge of the diffuser body is flush with or disposed above the level of an adjacent trailing edge of the undertray in a vertical direction.

19. The vehicle according to claim 18 wherein in the deployed position, a leading edge of the diffuser body is coplanar with an adjacent trailing edge of the undertray, or differs in planar angle by less the 2 degrees, and/or a lowest part of the diffuser body lies on or above a line extending rearwards tangentially from a vehicle rear wheel to intersect a lowest point of the rear of the body of the vehicle.

* * * * *